United States Patent [19]
Granberg

[11] Patent Number: 5,701,799
[45] Date of Patent: Dec. 30, 1997

[54] PLURAL ROTARY ACTUATORS

[75] Inventor: Rune Granberg, Älvsjö, Sweden

[73] Assignee: AB Rexroth Mecman, Stockholm, Sweden

[21] Appl. No.: 625,806

[22] Filed: Mar. 28, 1996

[30] Foreign Application Priority Data

Mar. 31, 1995 [SE] Sweden .................. 9501186

[51] Int. Cl.⁶ .................................................. F01C 9/00
[52] U.S. Cl. ........................... 92/125; 92/121; 92/147; 92/170.1
[58] Field of Search .................. 92/120, 121, 122, 92/123, 124, 125, 146, 147, 170.1; 418/213, 214

[56] References Cited

U.S. PATENT DOCUMENTS

| | | | |
|---|---|---|---|
| 860,619 | 7/1907 | Pagendarm | 92/120 |
| 2,974,645 | 3/1961 | Wik | 92/120 |
| 3,139,834 | 7/1964 | Blumgren et al. | |
| 3,446,120 | 5/1969 | Sneen | |
| 3,732,786 | 5/1973 | Grosseau | 92/121 |
| 4,548,561 | 10/1985 | Bitar | 418/213 |
| 4,825,754 | 5/1989 | Devaud et al. | |
| 5,040,453 | 8/1991 | Eicher et al. | |
| 5,330,333 | 7/1994 | Holmes | |

FOREIGN PATENT DOCUMENTS

| | | |
|---|---|---|
| 0384948 | 6/1989 | European Pat. Off. |
| 0 580 319 A1 | 1/1994 | European Pat. Off. |
| 1750601 | 5/1968 | Germany |
| 1 503 343 | 7/1970 | Germany |
| 48046 | 4/1917 | Sweden ............ 418/212 |
| 0224276 | 12/1965 | Sweden |
| 2239053 | 6/1991 | United Kingdom |

*Primary Examiner*—Thomas E. Denion
*Attorney, Agent, or Firm*—Townsend and Townsend and Crew LLP

[57] ABSTRACT

A rotary actuator (1) comprising a housing (2), which defines a working chamber (3) for actuation with a pressure fluid and having at least partially circular section, a pivoting piston (5) which is arranged sealingly against the inner wall (4) of and rotatable between two end positions in the working chamber, is featured in that the pivoting piston (5) itself is pivotally supported in bearings (16) which are arranged in the housing (2) axially at each side of the working chamber (3), and wherein it comprises means for cooperation with an external rotary shaft, whereby the housing (2) on at least one of its end walls is adapted so as to be contacted against and be fixedly fastened to a corresponding end wall portions of a second rotary actuator housing (2), and whereby these housings are fixable to one another in such a way that the axes (X) of the pivoting pistons of the respective housings are coaxial and that the pivoting pistons thereby are capable of affecting one common outgoing shaft.

7 Claims, 2 Drawing Sheets

PLURAL ROTARY ACTUATORS

BACKGROUND OF THE INVENTION

The present invention concerns a rotary actuator.

Such a rotary actuator is previously known from GB-A-2 239 053. This known rotary actuator comprises a housing having a working chamber which is divided perpendicular to the pivot axis and a pivoting piston arranged therein. The bearing arrangement of the pivoting piston is the bearing arrangement of the outgoing rotary shaft and is positioned axially outermost on each side of the housing. This construction presupposes accuracy of manufacture on several surfaces, such as the cooperating surfaces between the rotary piston and the shaft as well as the surfaces cooperating between the shaft and the housing. Furthermore, the solution presupposes complicated assembly wherein the parts in question must be adapted with precision to each other. If rotary actuators with different performances are required, the described rotary actuator must be dimensioned in accordance therewith.

SE-C-224 276 describes a ring piston motor wherein the piston unit comprises bearing connection with the housing. The document however, does not discuss problems which are related to adjusting the rotary actuator to different performance demands and there are no practical possibilities of connecting one rotary actuator housing with an other.

SUMMARY OF THE INVENTION

It is a purpose of the present invention to eliminated the problems of the known art and to provide a rotary actuator which may be manufactured at low cost and with great precision. This and other purposes are achieved in a rotary actuator made according to the present invention.

By the pivoting piston itself being supported by bearings in the housing the adding of tolerances is minimized so that the necessary accuracy may be easily achieved. It is further achieved that the assembly process is simplified and that the resulting product thereby may be produced at a very competitive price. By the pivoting piston comprising means for cooperation with an external rotary shaft, simple exchange further may be achieved, for example to a longer or a shorter shaft, because of the shaft only having rotary connection with the pivoting piston and no bearing connection as is the case with rotary actuators as mentioned initially. The features concerning the adaption of the end wall of the housing result in that series coupling with respect to power of two or more rotary actuator housings is possible for actuating a common outgoing shaft. This way a kind of modular construction is obtained which allows rotary actuators according to the invention to be combined such that a series of rotary actuators having different capacity is obtained simply by connecting and combining a limited number of base units. The adaption which comes into question is an adjusted shape of meeting surfaces, and means for fixing the connection.

The piston preferably includes an axially extending hole for cooperation with the rotary shaft. The hole and shaft preferably have splines for rotary motion transmission. The housing is preferably divided into two parts secured to one another by tubular rivets distributed about the working chamber. This arrangement for the housing assembly is reliable and is labor-saving during assembly.

The tubular rivets provide a preferred arrangement for coupling together rotary actuator housings, whereby no particular recesses, holes or the like need to be provided for, said coupling being obtained without the respective rotary actuators in any way having to be opened or their working chamber seal being affected.

The housing and/or pivoting piston are preferably made by injection molding using a form-stabilized reinforced plastic. This feature provides; a useful as well as cost effective way of manufacturing important components of the rotary actuator, since such rational manufacturing methods are made possible by the invention.

The divider element is preferably integrally manufactured with the housing parts so the divider element does not comprise a separate but an integral unit which besides a seal receiving function also has a stop function.

BRIEF DESCRIPTION OF THE DRAWINGS

The invention will no be described in greater detail on hand of a example and the annexed drawings, wherein.

DESCRIPTION OF THE PREFERRED EMBODIMENTS

Figure 1:
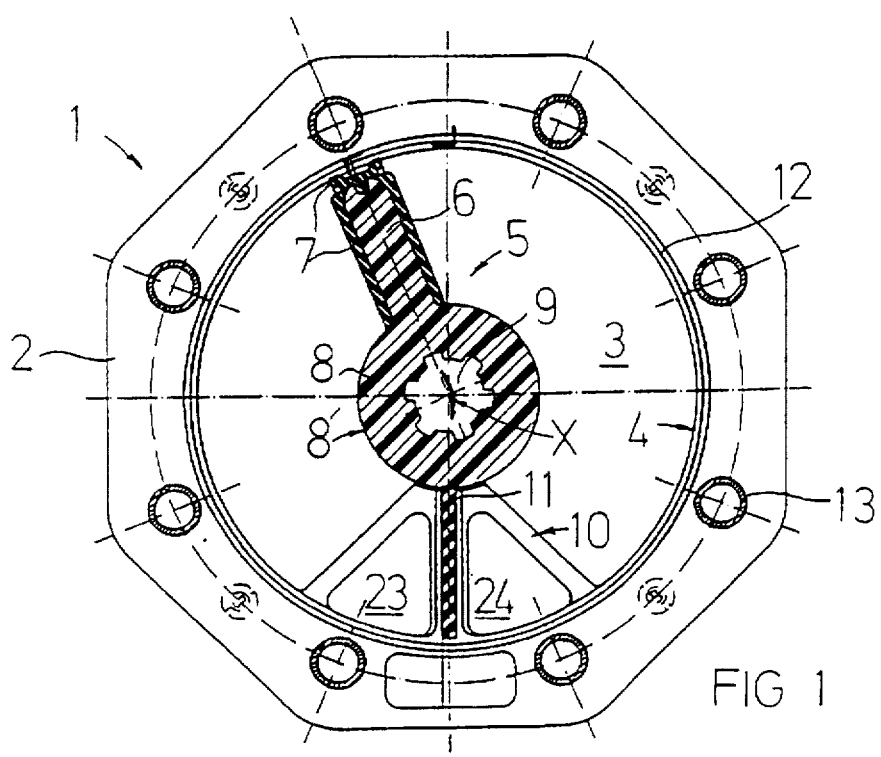
FIG. 1 illustrates a rotary actuator according to the invention in a section perpendicular its axis.

The rotary actuator according to FIG. 1 comprises a housing 2, which defines a working chamber 3, the inner surface 4 of which having a circular section and cooperating with a pivoting piston 5. This pivoting piston 5 comprises as commonly a wing 6, which via piston seals 7 seals against the inner surface 4 of the working chamber. Centrally the pivoting piston 5 is provided with a cylindrical central portion 8 and centrally therein a hole 9 for cooperation with a rotary shaft (not shown) having an axis X, said hole 9 inwardly being provided with rotation transmitting means, in this case so called splines.

Lowermost in the working chamber 3 FIG. 1 shows a divider element 10 which is comprised of plate shaped parts extending from the surface 4 of the working chamber against its central area, said plate shaped parts on the one hand comprising stop for the wing 6 in the end positions of the pivoting piston 5 and on the other hand to receive a sealing element 11 for cooperation with the cylindrical central portion 8 of the pivoting piston 5, and arranged to divide the working chamber 3 into a positive and negative chamber. Coaxially with the rotary shaft of the pivoting piston 5 the housing 2 in the dividing plane is provided with a circular guide groove (recess) 12 at a small distance outside the surface 4 for receiving a guide ring (15 in FIG. 2). 13 depicts tubular rivets for fixation of the parts of the housing 2 in the axial direction.

Figure 2:
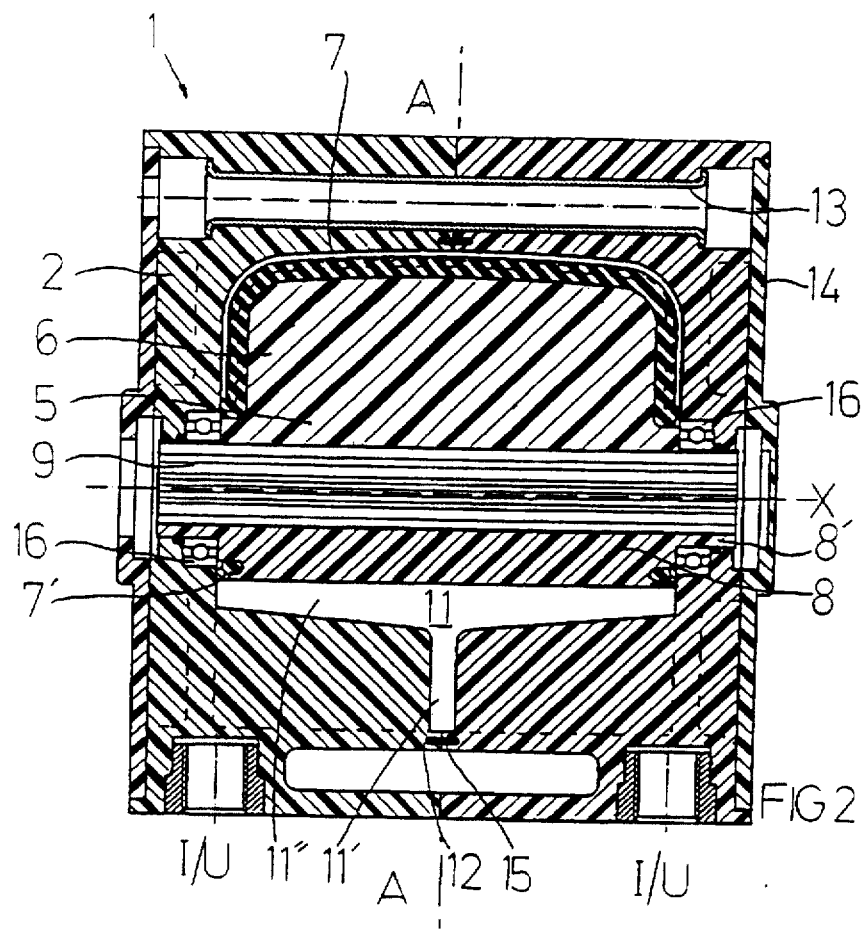
FIG. 2 illustrates a rotary actuator according to FIG. 1 in an axial section.

In FIG. 2 the rotary actuator is thus illustrated in an axial section whereby the dividing plane A-A is shown which thus comprises the plane shown in FIG. 1.

FIG. 2 illustrates the guide groove 12 which receives the guide ring 15, whereby the cooperation of said means, when the rotary actuator housing is assembled, guide and align the housing portions in a reliable manner. Further a T-shaped sealing element 11 is illustrated which is provided with a longitudinal axial sealing portion 11" for cooperation with the cylindrical central portion of the pivoting piston, and further has a vertical portion 11'. These arrangements are however not subject of this patent application.

In the example shown the pivoting piston is provided with a bearing arrangement axially outside the working chamber, whereby pivoting piston bearings 16 having roller elements are arranged on the one hand to be received in seats for this purposes in the respective portion of the housing 2, and on the other hand pivotally support the pivoting piston. The pivoting piston, as previously has been mentioned, comprises a piston seal 7 which seals against the working chamber surface and also a circular seal 7' which seals against the working chamber radially outside and surrounding said bearings 16. FIG. 2 further illustrate a tubular rivet 13 for axial fastening together of the housing and a cover 14 on each end side of the housing.

In use of a rotary actuator according to FIG. 1 and 2 a working shaft is inserted, said shaft having rotary transmitting means complementary to the hole 9, in the case of for example so called splines, which means axially extending cog shaped protrusions, into the hole 9. This working shaft (which is not shown) is by this invention easily adjusted to the application in question with respect to its length, to the shape with respect to the situation outside the rotary actuator etc. This may be achieved by the pivoting piston itself comprising the means for bearing cooperation with the housing 2, said means in FIG. 2 being integral, sidewardly axially extending hub portions 8' In the shown example the hub portions 8' each has a circular cylindrical configuration which normally is preferred in order to receive the inner ring of each bearing 16.

Easy adjustment of the rotary actuator to different applications means that only the working shaft needs to be subject of possible modification for different working situations. Therefore adjustment of the rotary actuator may be limited to modifying the length of the working shaft and/or the external configuration outside the rotary actuator.

Figure 3:
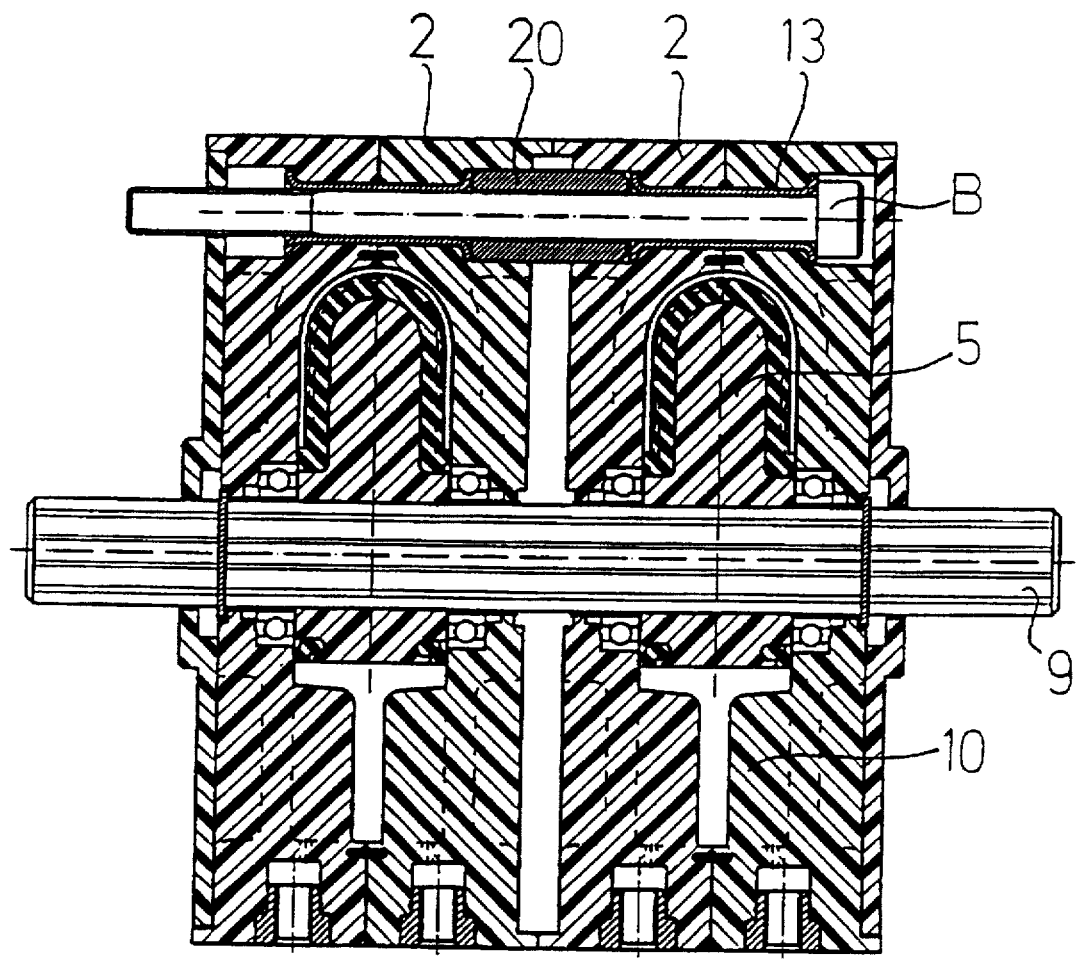
FIG. 3 illustrates a series coupling of two rotary actuators in an axial section.

The subject of this invention is to provide a rotary actuator which, if greater power is needed on said working shaft, is adapted on at least one of its end sides such that it may be coupled to one or several other rotary actuators such that the axis X of the respective rotary actuators coincide. This is shown in FIG. 3, whereby two rotary actuators are working in series on one common shaft 9. The connection in the shown example is provided by tension bolts B or similar means extending through the holes which are formed inside the tubular rivets 13. Further, aligning sockets 20 are inserted into the recesses which are present axially outside the tubular rivets 13 in order to align the (here) two rotary actuators. This way further means inside or outside the rotary actuator housing for allowing connection of rotary actuators are avoided which could possibly weaken the housing or result in adding of dirt collecting irregularities. By the connection also the angular stroke of the resulting connected rotary actuator unit may be limited by the pivoting pistons 5 and/or the dividing elements 10 of the different connected units initially having different angular position with respect to each other. The resulting rotary angle will thereby become the smallest common free pivot angle of all connected rotary actuators.

By the possibility of connecting two or more rotary actuators to one unit in the described way it is obtained that a reduced number of basic sizes of rotary actuators has to be manufactured, which by coupling together will represent a large number of rotary actuator units with different performance.

Using tubular rivets 13 allows connecting in a simple and clean way of rotary actuators according to the invention to a holder or another base.

The rotary actuators according to the invention may be manufactured otherwise than what is shown in the Figures. Therefore housing as well as pivoting piston may be shaped otherwise with respect to for example radial to axial dimension of the rotary actuator. The rotary actuator may hereby be made flatter (FIG. 3) or more longitudinal if this is called for with respect to space reasons.

Also the bearing arrangement between the pivoting piston and the housing may be arranged otherwise, for example with a different kind of bearings, another arrangement of the hub 8' etc. As an example it could be mentioned that the pivoting piston may comprise an inner socket portion comprising or being placed inside its central portion 8, said socket portion comprising the hole 9, the rotary transmitting means and possibly the hub portions 8', and said socket portion possibly being manufactured in another, for example a more resistant, material that the rest of the rotary piston and possibly comprising particular precision manufactured surfaces inside the hole 9 and/or at the hub portions 8'.

It is preferred that the rotary actuator housing according to the invention is injection moulded in a form stable plastic material which is reinforced with a suitable reinforcing material, for example glass. As an example Kevlar may also be used as reinforcing material. Manufacture in a suitable metal may also come into question for many embodiments.

The pivoting piston 5 is preferably also manufactured in an injection moulding process in the same or similar material and possibly with a particular socket portion according to the above in its central portion 8.

I claim:

1. Rotary actuator (1) comprising a housing (2) having end walls, said housing defining a working chamber (3) for actuation with a pressure fluid, the working chamber having an at least partially circular section bounded by an inner wall (4), sides and two end positions, a pivoting piston (5) having an axis (X), the piston being arranged sealingly against the inner wall (4) of and pivotable between the two end positions of the working chamber, characterized in that the pivoting piston (5) being pivotally supported in bearings (16) which are arranged in the housing (2) axially at each said side of the working chamber (3), the piston comprising means for cooperation with an external rotary shaft, whereby the housing (2) on at least one of its end walls is adapted so as to be contacted against and be fixedly fastened to a corresponding end wall of a second rotary actuator housing (2), and whereby these housings are fixable to one another in such a way that the axes (X) of the pivoting pistons of the respective housings are coaxial and that the pivoting pistons thereby are capable of affecting a common outgoing shaft, each housing (2) being divided through its working chamber (3) perpendicular to its axis (X) into housing parts, the housing parts being fixed together by tubular rivets (13) having rivet axes parallel with said axis (X), said rivets having through holes inside the tubular rivets (13) for receiving fastening means for mutual fastening of the housing, said tubular rivets (13) being distributed around and outside the working chambers in such a way that to allow the housings to be fastened together.

2. Rotary actuator according to claim 1, wherein said means for cooperation is constituted of a rotary drive surface partially defining an axially extending hole (9) which extends through at least a part of the axial length of the pivoting piston (5).

3. Rotary actuator according to claim 1, wherein said rotary drive surface is a part of an inwardly and axially extending rotary transmitting element.

4. Rotary actuator according to claim 1, wherein the housing parts and the pivoting pistons (5) are injection molded, form-stable reinforced plastic components.

5. Rotary actuator according to claim 4, further comprising a sealing element (11), and wherein said pistons each comprise a radially inner surface (8'), each housing part comprises an integral divider element (10), said divider element comprising piston stop surfaces, which define said two end positions, and a holder for positioning the sealing element (11) against the radially inner surface (8') of the pivoting piston.

6. Rotary actuator according to claim 1, wherein the piston (5) comprises an inner socket portion which constitutes said means for cooperation with an external rotary shaft, and wherein said piston also comprises a generally cylindrical central portion (8) having reduced-diameter end hub portions (8') which engage said bearings (16).

7. A rotary actuator assembly comprising:

first and second rotary actuators, each said rotary actuator comprising:

a housing having first and second end walls;

a working chamber formed in the housing and defined in part by an at least partially circular inner wall and two end positions;

a pivoting piston pivotally mounted within the working chamber, said piston having a piston axis, a piston hole formed through the piston to be collinear with the piston axis, and a surface which sealingly engages the inner wall, said piston being pivotable about said piston axis between the two end positions, said piston axis passing through said end walls of said housing;

said housing comprising first and second housing parts; and said housing parts secured to one another by tubular rivets having rivet bores formed therethrough, the rivet bores defining rivet axes oriented generally parallel to said piston axis, said rivet bores circumscribing said working chamber;

the first end wall of the first rotary actuator being opposite the second end wall of the second rotary actuator with the corresponding piston and rivet axes being generally collinear; and a plurality of fasteners extending into the generally collinear rivet bores of said first and second rotary actuators;

whereby said first and second rotary actuators can operate in unison with a common shaft engaging the piston holes.

* * * * *